June 12, 1928.
A. J. MASON
1,673,466
FIELD WAGON AND UNLOADING APPARATUS
Filed Dec. 4, 1926   3 Sheets-Sheet 1
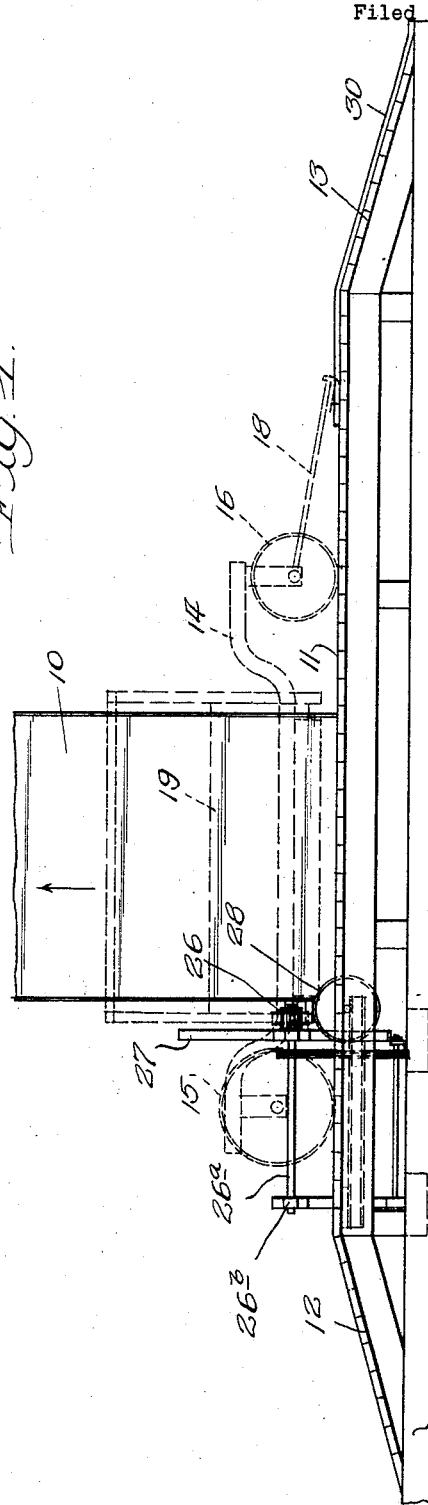
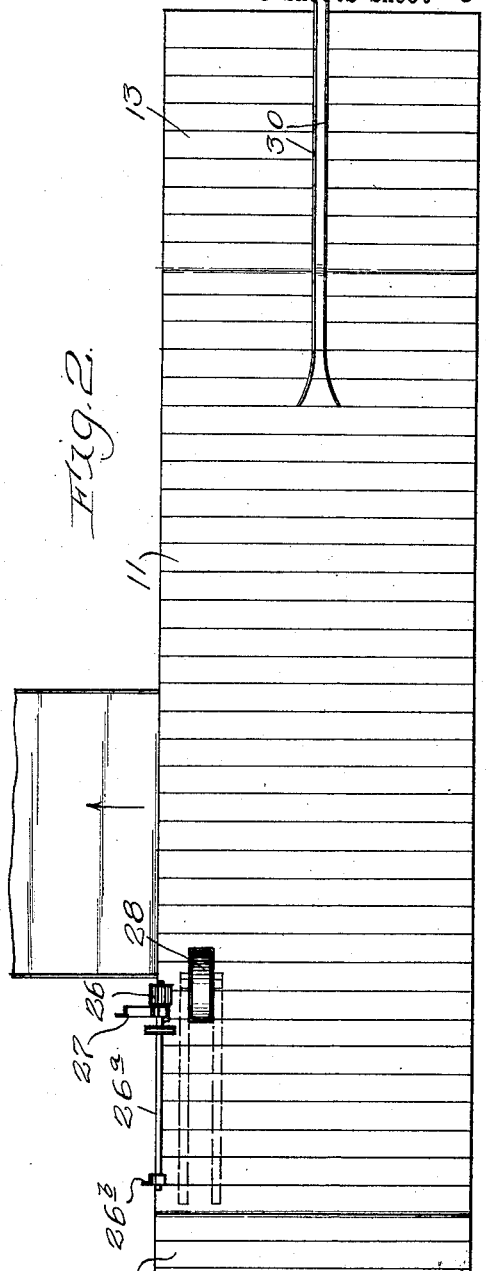
Inventor:
Arthur J. Mason,
By Dynenforth, Lee, Chritton & Wiles,
Attys.

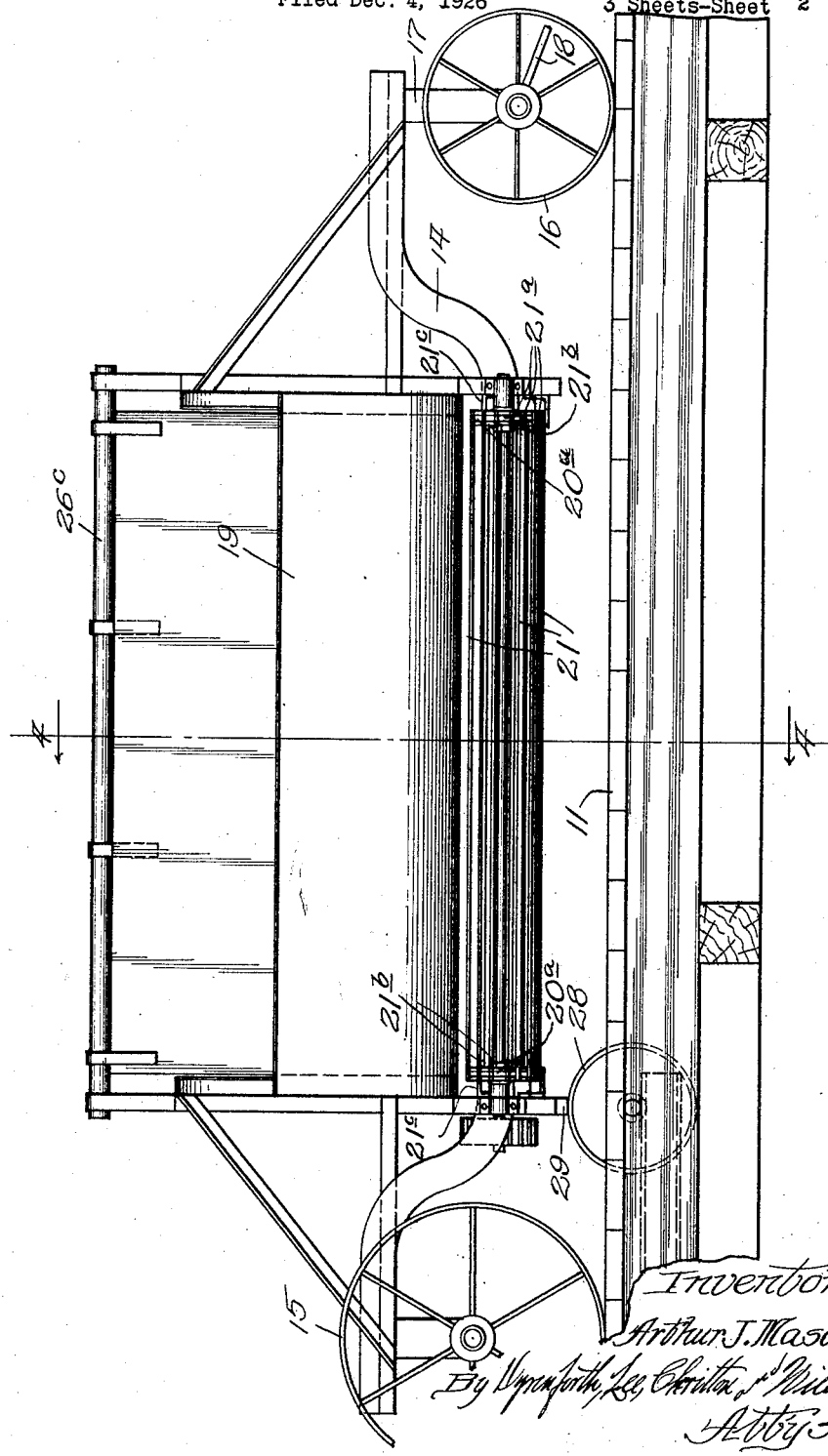

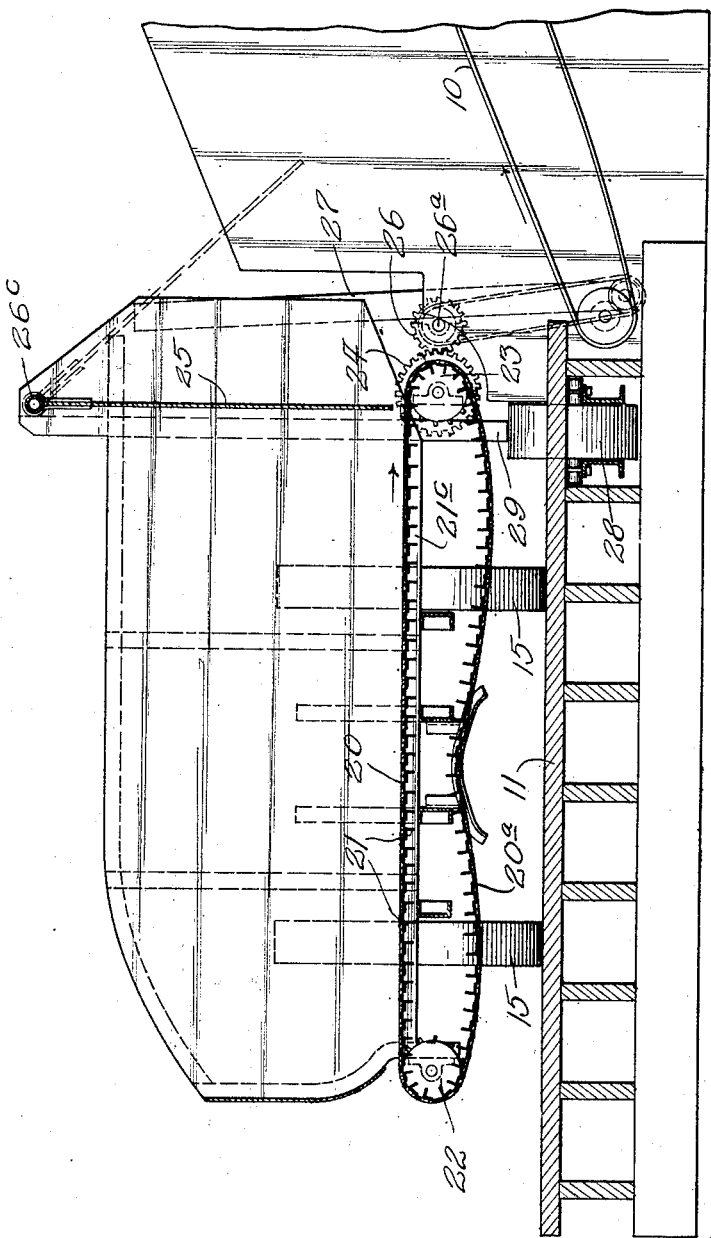

Patented June 12, 1928.

1,673,466

UNITED STATES PATENT OFFICE.

ARTHUR J. MASON, OF HOMEWOOD, ILLINOIS, ASSIGNOR TO MASON ALFALFA PROCESS COMPANY, A CORPORATION OF DELAWARE.

FIELD WAGON AND UNLOADING APPARATUS.

Application filed December 4, 1926. Serial No. 152,675.

This invention relates to improvements in field wagon and unloading apparatus, and more especially to such a wagon and apparatus particularly adapted for use in connection with the harvesting of crops preparatory to drying, desiccating, or curing the same.

In my co-pending patent application Serial No. 129,986, filed August 18, 1926, I disclosed apparatus and process for automatically and continuously forming an endless mat of substantially uniform texture, thickness, density and permeability. In the practice of the invention there disclosed, such a mat formed of the cut crop is passed usually through a drying oven resting upon a conveyor. The conveyor is more or less porous and as it passes through the oven a drying agent is circulated through the mat. In another patent application about to be filed or co-pending, I treated more particularly of such a drying oven; and in another patent application about to be filed or co-pending, I treated more particularly of a furnace adapted for furnishing a drying agent for use in such an oven.

In the present patent application, I disclose a field wagon especially adapted for receiving the crop as it is cut in the field and conveying it to the mat making machine where, in connection with unloading apparatus, the contents of the wagon are quickly and easily unloaded onto the conveyor or feeder of the mat making machine.

One of the features of my invention is the provision of such a field wagon that may be easily loaded, hauled, and unloaded.

Other features and advantages of my invention will appear more fully as I proceed with my specification.

In that form of device embodying the features of my invention shown in the accompanying drawings, Fig. 1 is a view in side elevation of the unloading platform showing a field wagon thereon drawn in broken lines, Fig. 2 is a top plan view of the unloading platform, Fig. 3 is a view in side elevation of the field wagon, and Fig. 4 is a view taken as indicated by the line 4 of Fig. 3.

As shown in the drawings, 10 indicates the conveyor or feeder of a mat making machine (not shown). For example, such mat making machine may be as disclosed in my co-pending patent application Serial No. 129,986, filed August 18, 1926. As shown in Figs. 1 and 2 the direction of movement of the conveyor or feeder 10 is indicated by the arrows. In the formation of a mat, the cut crop is deposited on the conveyor 10 whereupon it is conveyed into the mat making machine.

The present invention deals more particularly with the wagon adapted to transport the crop from the field where it is cut to the mat making machine, and the means for unloading the crop from the wagon onto the conveyor 10. Although, I have shown the wagon particularly adapted for use in connection with the cutting of crops, it is to be understood that the same is capable of many other uses; and likewise, instead of depositing the crop onto the conveyor of a mat making machine, the contents of the wagon may be unloaded onto other apparatus or deposited for storage.

At the point where the field wagon is to be unloaded there is preferably provided a raised platform 11, although, if desired, the unloading can take place on the level. In the event a raised platform 11 is provided, there is also preferably provided a receiving ramp 12 at one end and a discharge ramp 13 at the other end.

The field wagon itself comprises any suitable chassis or frame 14 supported on wheels. I have here shown two back wheels 15, 15 and a pair of front wheels 16, 16 mounted on a front axle rotatable in the usual manner about the vertical axis 17. 18 indicates the usual tongue by which the wagon may be drawn. For example, I have found it desirable to haul the wagon by means of a tractor, attaching the same to the rear end of the tractor by the tongue 18.

Suitably supported on the chassis or frame 14 is a rectangular box 19 formed of sheet steel or other suitable material. The floor of the wagon box consists of the upper span of an endless conveyor 20 which is transversely arranged. The conveyor preferably consists of two chains 20$^a$ joined by a series of angle iron slats 21, as shown. The angle irons preferably have the lower rib or flange folded upwardly at each end flat against the upper or horizontal flange as indicated by 21$^a$. The ends of the angle iron slats are joined to the chains by means of the bolts 21<sup>b</sup>. The upper strand of the conveyor is supported at each side by means of the tracks or guides 21<sup>c</sup>, which the chains rest upon.

In Fig. 4 the direction of movement of the conveyor is shown by the arrow; but it is to be understood that the conveyor does not move except during the unloading operation.

The two ends of the conveyor are suitably supported at the sides of the wagon by means of the drums 22 and 23 respectively, the former acting as an idler and the latter provided at one end with a pinion 24.

At the discharge side of the wagon there is provided a door 25 hinged at its upper edge to the bar 26<sup>c</sup>. That is, the hinged or swinging door 25 virtually forms the side of the wagon at the discharge side. The door is heavy enough so that it retains the crop in the wagon until the conveyor 20 is operated to discharge the same.

At the point of discharge, there is provided a gear wheel 26 which is here shown as adapted for continuous rotation. Any suitable means, not shown, may be provided for driving the gear wheel 26. The gear wheel 26 is carried on a shaft 26<sup>a</sup>, one end of which is in turn supported by a lever 27, and is arranged so that when the field wagon is spotted for unloading, the lever 27 may be moved to bring the gear wheel 26 into mesh with the gear wheel 24. The other end of the shaft 26<sup>a</sup> is supported in a bearing 26<sup>b</sup>, sufficient looseness being provided to permit movement of the other end of the shaft by the lever 27 to cause the gears 24 and 26 to mesh. In the use of the wagon as here shown, the same is adapted to be unloaded when on the platform 11 opposite the end of the conveyor or feeder 10.

On the platform 11, there is also provided a supporting roller 28 adapted to receive the lower end of a vertical post 29 on the rear corner of the field wagon adjacent the discharge side. When the wagon is spotted in position for unloading the post 29 rests on the roller 28 so that when the gears 24 and 26 are engaged, downward movement of this corner of the field wagon is prevented.

In the unloading operation, the conveyor 20 moves in the direction indicated by the arrow in Fig. 4, thus moving the crop toward the discharge side. The door 25 is pushed outwardly by movement of the crop in the position indicated by the broken lines, whereupon the crop issues from the wagon onto the conveyor 10 and is carried to the mat making machine (not shown). Obviously, upon issuing from the wagon any other disposition of the contents thereof may be made as desired.

The discharge ramp 13 of the platform 11 is provided with two centrally arranged parallel rails or guides 30, 30 between the upper ends of which the end of the tongue is adapted to rest when the wagon is in unloading position. After the wagon has been unloaded, the same is preferably removed from the unloading platform by pushing or bumping it out of the way by the tractor bringing in another loaded wagon.

When the unloaded wagon is pushed off of the platform 11 it runs down the ramp 13 and the end of the tongue 18 lying between the rails 30, 30, operates to hold the front wheels 16 straight so that it will not run off to the side. Its momentum carries it some distance beyond the platform 11, a sufficient distance so that the tractor bringing in the newly loaded wagon can leave the platform, pass around the same and pick it up to take it out to the field.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. A wagon and unloading apparatus of the character described comprising; a frame; supporting wheels carrying said frame; a box carried by said frame; two drums carried by said frame at the sides of said wagon; an endless conveyor carried by said drums and forming the bottom of said box; a gear wheel on one of said drums; another gear wheel at the discharge point; means for meshing said gear wheels; a supporting roller at the discharge point; and a bar on the wagon adapted to rest on said supporting roller when the wagon is in discharging position.

2. A wagon and unloading apparatus of the character described comprising; a frame; supporting wheels carrying said frame; a box carried by said frame; two drums carried by said frame at the sides of said wagon; an endless conveyor carried by said drums and forming the bottom of said box; a gear wheel on one of said drums; a raised unloading platform at the discharge point; another gear wheel at said discharge point; means for meshing said gear wheels when the wagon is in discharging position on the raised unloading platform; a supporting roller on said platform; and a bar on the wagon adapted to rest on said supporting roller when the wagon is in discharging position.

3. A wagon and unloading apparatus of the character described comprising; a frame; two rear wheels and two front wheels carrying said frame, said front wheels being mounted on a rotatable axle with a tongue; a raised unloading platform at the discharge point; a receiving ramp and a discharge ramp leading to and from said unloading platform respectively; and a pair of guides on the discharge ramp adapted to engage the end of the tongue of the wagon to guide it in descending the discharge ramp.

4. A wagon and unloading apparatus of the character described comprising; a frame; two rear wheels and two front wheels carrying said frame, said front wheels being mounted on a rotatable axle with a tongue; a raised unloading platform at the discharge point; a receiving ramp and a discharge ramp leading to and from said unloading platform respectively; and guide means on the discharge ramp adapted to engage the end of the tongue of the wagon to guide it in descending the discharge ramp.

5. A wagon and unloading apparatus of the character described comprising; a frame; supporting wheels carrying said frame; a box carried by said frame; two drums carried by said frame at the sides of said wagon; an endless conveyor carried by said drums and forming the bottom of said box, a gear wheel on one of said drums; another gear wheel at the discharge point; means for meshing said gear wheels; a supporting roller at the discharge point; and a part on the wagon adapted to rest on said supporting roller when the wagon is in discharging position.

6. A wagon and unloading apparatus of the character described comprising; a frame; supporting wheels carrying said frame; a box carried by said frame; two drums carried by said frame at the sides of said wagon; an endless conveyor carried by said drums and forming the bottom of said box, a gear wheel on one of said drums; another gear wheel at the discharge point; means for meshing said gear wheels; a supporting roller at the discharge point; and a part on the wagon substantially below said gear wheels adapted to rest on said supporting roller when the wagon is in discharging position.

In testimony whereof, I have hereunto set my hand this 10th day of November A. D. 1926.

ARTHUR J. MASON.